United States Patent
Bender et al.

(10) Patent No.: US 7,091,284 B2
(45) Date of Patent: Aug. 15, 2006

(54) HYDROGENATED NITRILE RUBBERS WITH IMPROVED LOW-TEMPERATURE PROPERTIES

(75) Inventors: Harald Bender, Pulheim (DE); Rudolf Casper, deceased, late of Leverkusen (DE); by Rotraud Casper, legal representative, Leverkusen (DE); Hans Rafael Winkelbach, Cologne (DE); Hans Christian Strauch, Dormagen (DE); Paul Nguyen, London (CA); Sharon X. Guo, Stratford (CA); Janet Gamlin, Sewickley, PA (US)

(73) Assignees: Bayer AG, Leverkusen (DE); Bayer Inc., Sarnia (CA)

( * ) Notice: Subject to any disclaimer, the term of this patent is extended or adjusted under 35 U.S.C. 154(b) by 295 days.

(21) Appl. No.: 10/362,347

(22) PCT Filed: Aug. 21, 2001

(86) PCT No.: PCT/CA01/01189

§ 371 (c)(1),
(2), (4) Date: Nov. 18, 2003

(87) PCT Pub. No.: WO02/16441

PCT Pub. Date: Feb. 28, 2002

(65) Prior Publication Data

US 2004/0097660 A1    May 20, 2004

(30) Foreign Application Priority Data

Aug. 25, 2000 (CA) .................................. 2317364

(51) Int. Cl.
*C08F 8/04* (2006.01)

(52) U.S. Cl. .................... 525/329.3; 525/338; 525/339
(58) Field of Classification Search ............ 525/329.3, 525/338, 339
See application file for complete search history.

(56) References Cited

U.S. PATENT DOCUMENTS

| | | | |
|---|---|---|---|
| 3,700,637 A | 10/1972 | Finch, Jr. ..................... 260/83.3 |
| 4,102,844 A * | 7/1978 | Schwinum et al. ......... 524/745 |
| 4,464,515 A | 8/1984 | Rempel et al. .............. 525/338 |
| 4,503,196 A | 3/1985 | Rempel et al. .............. 525/338 |
| 4,581,417 A | 4/1986 | Buding et al. .............. 525/338 |
| 4,631,315 A | 12/1986 | Buding et al. .............. 525/338 |
| 4,746,707 A | 5/1988 | Fiedler et al. .............. 525/338 |
| 4,795,788 A | 1/1989 | Himmler et al. ............ 525/338 |
| 4,812,528 A | 3/1989 | Rempel et al. .............. 525/338 |
| 4,816,525 A | 3/1989 | Rempel et al. .............. 525/338 |
| 4,876,314 A * | 10/1989 | Hoxmeier et al. .......... 525/338 |
| 4,978,771 A | 12/1990 | Fiedler et al. .............. 558/459 |
| 5,272,202 A * | 12/1993 | Kubo et al. ................. 524/565 |
| RE34,548 E | 2/1994 | Fiedler et al. ............ 525/329.3 |
| 5,399,632 A * | 3/1995 | Costello et al. ............. 525/339 |
| 5,651,995 A * | 7/1997 | Oyama et al. .............. 524/565 |

FOREIGN PATENT DOCUMENTS

| EP | 0 471 250 | 2/1992 |
|---|---|---|
| GB | 1 558 491 | 1/1980 |

* cited by examiner

*Primary Examiner*—Bernard Lipman
(74) *Attorney, Agent, or Firm*—Jennifer R. Sang

(57) ABSTRACT

Hydrogenated copolymers of an unsaturated nitrile, butadiene and isoprene, wherein the molar ratio of butadiene to isoprene is less than 3:1, display valuable low temperature properties.

8 Claims, No Drawings

HYDROGENATED NITRILE RUBBERS WITH IMPROVED LOW-TEMPERATURE PROPERTIES

FIELD OF THE INVENTION

The present invention relates to novel nitrile rubbers that have improved low temperature properties.

BACKGROUND OF THE INVENTION

Hydrogenated nitrile butadiene rubber (HNBR) is a valuable elastomer known for its combination of unique properties, including high tensile strength, resistance to abrasion, high oil resistance and resistance to oxidation. There is an increasing demand for elastomers that display these valuable properties at low temperatures. Car manufacturers are requesting elastomers that can be used over a temperature range from −40° C. to +155° C. For aerospace applications elastomers are sought whose working temperature range extends down to −60° C. or even −70° C.

There are known HNBR's that are useful at low temperature. There are commercially available HNBR's that have good low temperature properties. Thus, Therban® XN 535C is a terpolymer, available from Bayer, composed of 21% acrylonitrile, acrylate, and butadiene, that has a residual double bond content (RDB) of 5.5% and a glass transition temperature (Tg) of −38° C. Therban® VP KA 8798 is similar, but differs in having an RDB of less than 0.9%, and, again, has a Tg of −38° C.

European Patent No. 471,250 of Bayer AG, issued February 1992, the disclosure of which is incorporated herein by reference, discloses hydrogenated butadiene/isoprene/(meth)acrylonitrile copolymers. The patent teaches that isoprene-modification of HNBR improves compression set at low temperature (for 97.1 to 98.6% hydrogenation, i.e. 2.9 to 1.4% RDB). The patent discloses copolymers containing 3.5 to 22% by weight of copolymerized isoprene and 18 to 50% by weight of copolymerized acrylonitrile or methacrylonitrile, and having a degree of hydrogenation, based on the C═C double bonds of the polymer, of at least 85%, that is, an RDB not greater than 15%. The examples used copolymers with acrylonitrile contents of 34.1%, 33.3% and 33.5% and isoprene contents of 4.1%, 7.9% and 12.0%, respectively, the balance in each case being butadiene. The degrees of hydrogenation of isoprene were 86.3%, 86.6% and 82.9%, respectively.

SUMMARY OF THE INVENTION

It has now been found that by careful selection of the content of the copolymer there can be obtained an elastomer whose low temperature properties are markedly improved, as compared with the copolymers disclosed in European Patent No. 471,250. In particular, the inventors have surprisingly found significant improvement in low temperature flexibility as shown by Gehman and Temperature Retraction tests, and lowered glass transition temperature values identified by Differential Scanning Calorimetry (DSC).

Accordingly, the present invention provides a hydrogenated copolymer of an unsaturated nitrile, butadiene and isoprene, wherein the molar ratio of butadiene to isoprene is less than 3:1.

DETAILED DESCRIPTION OF THE INVENTION

DESCRIPTION OF PREFERRED EMBODIMENTS

It has surprisingly been found that by lowering the butadiene:isoprene molar ratio in the hydrogenated copolymer there is effected an improvement in low temperature properties without a significant deleterious effect in the other properties of the HNBR. The lowest butadiene:isoprene molar ratio exemplified in the above-mentioned European patent 471,250 is greater than 4.5:1. In accordance with this invention the butadiene:isoprene ratio is below 3:1, preferably below 2:1. The ratio can be as low as 0.1:1, but is preferably not less than 0.5:1. Good results are obtained with a ratio of 1:1 and the preferred range is 0.75:1 to 1:0.75.

The butadiene plus isoprene usually constitute about 50 to about 85% of the copolymer, and the nitrile usually constitutes about 15 to 50% of the copolymer. For this invention, which is concerned with low temperature properties the nitrile content does not normally exceed 36% and is preferably below 30%. The normal lower limit on the nitrile content is 15%, because copolymers with lower nitrile contents lose their oil resistance. For applications where oil resistance is not of importance, however, lower nitrile contents are acceptable, down to 10% or even 5%. For most purposes a nitrile content of 15 to 25% is preferred.

The nitrile is normally acrylonitrile or methacrylonitrile or α-chloroacrylonitrile, of which acrylonitrile is preferred.

The polymer may also contain an amount, usually not exceeding about 10%, of another copolymerisable monomer, for example, an ester of an unsaturated acid, say ethyl, propyl or butyl acrylate or methacrylate, or a vinyl compound, for example, styrene, α-methylstyrene or a corresponding compound bearing an alkyl substituent on the phenyl ring, for instance, p-alkylstyrene such as p-methylstyrene. Other copolymerisable monomers include α,β-unsaturated acids, for example, acrylic, methacrylic, ethacrylic, crotonic, maleic (possibly in the form of its anhydride), fumaric or itaconic acid, and other conjugated dienes, for example 2,3-dimethyl-1,3-butadiene, 1,3-pentadiene and piperylene. The copolymer preferably is a solid that has a molecular weight in excess of about 60,000, most preferably in excess of about 100,000.

The copolymer that is to be hydrogenated can be made in known manner, by emulsion or solution polymerisation, resulting in a statistical polymer. The copolymer will have a backbone composed entirely of carbon atoms. It will have some vinyl side-chains, caused by 1,2-addition of the conjugated diene during the polymerisation. It will also have double bonds in the backbone from 1,4-addition of the diene. Some of these double bonds will be in the cis and some in the trans orientation. These carbon-carbon double bonds are selectively hydrogenated by the process of the invention, without concomitant hydrogenation of the nitrile groups present in the polymer. If carboxyl groups (from an α,β-unsaturated acid) are present, it is desired that these should not undergo hydrogenation.

Processes for the hydrogenation of NBR are known and may also be used for the production of the hydrogenation products according to the invention. Rhodium or titanium is generally used as the catalyst, although platinum, iridium, palladium, rhenium, ruthenium, osmium, cobalt or copper in the form of the metals, but preferably in the form of metal compounds, may also be used, cf. for example U.S. Pat. No. 3,700,637; DE-PS 2,539,132; EP 134 023; DE-OS 35 41

689; DE-OS 35 40 918; EP-A 298 386; DE-OS 35 29 252; DE-OS 34 33 392; U.S. Pat. No. 4,464,515; and U.S. Pat. No. 4,503,196.

Suitable catalysts and solvents for hydrogenation in homogeneous phase are described in the following, and in GB 1558491 of Bayer AG and in EP 471,250, previously incorporated herein by reference. It is not intended to restrict the catalysts and solvents for hydrogenation useful for the invention, and these are provided only by way of example.

The selective hydrogenation can be achieved by means of a rhodium-containing catalyst. The preferred catalyst is of the formula:

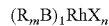

$(R_mB)_lRhX_n$ in which each R is a $C_1$–$C_8$-alkyl group, a $C_4$–$C_8$-cycloalkyl group a $C_6$–$C_{15}$-aryl group or a $C_7$–$C_{15}$-aralkyl group, B is phosphorus, arsenic, sulfur, or a sulphoxide group S=O, X is hydrogen or an anion, preferably a halide and more preferably a chloride or bromide ion, 1 is 2, 3 or 4, m is 2 or 3 and n is 1, 2 or 3, preferably 1 or 3. Preferred catalysts are tris-(triphenylphosphine)-rhodium(I)-chloride, tris (triphenylphosphine)-rhodium(III)-chloride and tris-(dimethylsulphoxide)-rhodium(III)-chloride, and tetrakis-(triphenylphosphine)-rhodium hydride of formula $((C_6H_5)_3P)_4$ RhH, and the corresponding compounds in which triphenylphosphine moieties are replaced by tricyclohexylphosphine moieties. The catalyst can be used in small quantities. An amount in the range of 0.01 to 1.0% preferably 0.03% to 0.5%, most preferably 0.1% to 0.3% by weight based on the weight of polymer is suitable.

It is known to use the catalyst with a co-catalyst that is a ligand of formula $R_mB$, where R, m and B are as defined above, and m is preferably 3. Preferably B is phosphorus, and the R groups can be the same or different. Thus there can be used a triaryl, trialkyl, tricycloalkyl, diaryl monoalkyl, dialkyl monoaryl diaryl monocycloalkyl, dialkyl monocycloalkyl, dicycloalkyl monoaryl or dicycloalkyl monoaryl co-catalysts. Examples of co-catalyst ligands are given in U.S. Pat. No. 4,631,315, the disclosure of which is incorporated by reference. The preferred co-catalyst ligand is triphenylphosphine. The co-catalyst ligand is preferably used in an amount in the range 0.3 to 5%, more preferably 0.5 to 4% by weight, based on the weight of the copolymer. Preferably also the weight ratio of the rhodium-containing catalyst compound to co-catalyst is in the range 1:3 to 1:55, more preferably in the range 1:5 to 1:45. The weight of the co-catalyst, based on the weight of one hundred parts of rubber, is suitably in the range 0.1 to 33, more suitably 0.5 to 20 and preferably 1 to 5, most preferably greater than 2 to less than 5.

The hydrogenation reaction can be carried out in solution. The solvent must be one that will dissolve butadiene nitrile rubber. This limitation excludes use of unsubstituted aliphatic hydrocarbons. Suitable organic solvents are aromatic compounds including halogenated aryl compounds of 6 to 12 carbon atoms. The preferred halogen is chlorine and the preferred solvent is a chlorobenzene, especially monochlorobenzene. Other solvents that can be used include toluene, halogenated aliphatic compounds, especially chlorinated aliphatic compounds, ketones such as methyl ethyl ketone and methyl isobutyl ketone, tetrahydrofuran and dimethylformamide. The concentration of polymer in the solvent is not particularly critical but is suitably in the range from 1 to 30% by weight, preferably from 2.5 to 20% by weight, more preferably 6 to 15% by weight and most preferably 10 to 15% by weight. The concentration of the solution may depend upon the molecular weight of the copolymer rubber that is to be hydrogenated. Rubbers of higher molecular weight are more difficult to dissolve, and so are used at lower concentration.

The reaction can be carried out in a wide range of pressures, from 10 to 250 atm and preferably from 50 to 100 atm. The temperature range can also be wide. Temperatures from 60 to 160°, preferably 100 to 160° C., are suitable and from 110 to 150° C. are preferred. Under these conditions, the hydrogenation is usually completed in about 3 to 7 hours. Preferably the reaction is carried out, with agitation, in an autoclave.

Hydrogenation of carbon-carbon double bonds improves various properties of the polymer, particularly resistance to oxidation. It is preferred to hydrogenate at least 70% of the carbon-carbon double bonds present. For some purposes it is desired to eliminate all carbon-carbon double bonds, and hydrogenation is carried out until all, or at least 99%, of the double bonds are eliminated. For some other purposes, however, some residual carbon-carbon double bonds may be required and reaction may be carried out only until, say, 90% or 95% of the bonds are hydrogenated. The degree of hydrogenation can be determined by infrared spectroscopy or $^1$H-NMR analysis of the polymer.

In some circumstances the degree of hydrogenation can be determined by measuring iodine value. This is not a particularly accurate method, and it cannot be used in the presence of triphenyl phosphine, so use of iodine value is not preferred.

It can be determined by routine experiment what conditions and what duration of reaction time result in a particular degree of hydrogenation. It is possible to stop the hydrogenation reaction at any preselected degree of hydrogenation. The degree of hydrogenation can be determined by ASTM D5670-95. See also Dieter Brueck, Kautschuk+Gummi Kunststoffe, Vol 42, No 2/3 (1989), the disclosure of which is incorporated herein by reference.

To extract the polymer from the hydrogenation mixture, the mixture can be worked up by any suitable method. One method is to distil off the solvent. Another method is to inject steam, followed by drying the polymer. Another method is to add alcohol, which causes the polymer to coagulate.

The catalyst can be recovered by means of a resin column that absorbs rhodium, as described in U.S. Pat. No. 4,985,540, the disclosure of which is incorporated herein by reference.

The hydrogenated isoprene nitrile butadiene rubber (HINBR) of the invention can be crosslinked. Thus, it can be vulcanized using sulphur or sulphur-containing vulcanizing agents, in known manner. Sulphur vulcanization requires that there be some unsaturated carbon-carbon double bonds in the polymer, to serve as reactions sites for addition of sulphur atoms to serve as crosslinks. If the polymer is to be sulphur-vulcanized, therefore, the degree of hydrogenation is controlled to obtain a product having a desired number of residual double bonds. For many purposes a degree of hydrogenation that results in about 3 or 4% residual double bonds (RDB), based on the number of double bonds initially present, is suitable.

The HINBR can be crosslinked with peroxide crosslinking agents, again in known manner. Peroxide crosslinking does not require the presence of double bonds in the polymer, and results in carbon-containing crosslinks rather than sulphur-containing crosslinks. As peroxide crosslinking agents there are mentioned dicumyl peroxide, di-t-butyl peroxide, benzoyl peroxide, 2,2'-bis(ter-butylperoxy)disopropyl benzene, 2,5-dimethyl-2,5-di(t-butylperoxy)-hexyne-3 and 2,5-dimethyl-2,5-di(benzoylperoxy)hexane and the like. They are suitably used in amounts of about 0.2 to 20 parts by weight, preferably 1 to 10 parts by weight, per 100 parts of rubber.

The HINBR of the invention can be compounded with any of the usual compounding agents, for example fillers such as carbon black or silica, heat stabilisers, antioxidants, activators such as zinc oxide or zinc peroxide, curing agents co-agents, processing oils and extenders. Such compounds and co-agents are known to persons skilled in the art.

The low temperature properties of the hydrogenated copolymers of the invention renders them suitable for many specialised applications. They are suited for extreme conditions of under-the-hood automotive applications, including belts, hoses and mountings such as engine mounts. Mention is made of rolls, especially high-hardness roll applications in, for instance, metal-working rolls, paper industry rolls, printing rolls and elastomer components for textile rolls. Resistance to fluids, especially fluids with aggressive additives renders the hydrogenated copolymers of the invention useful for seals, and also in oil well specialties as a consequence of low swell and explosive decompression resistance. They are also useful in wire and cable applications that demand excellent mechanical properties and high flexibility under critical ambient conditions. They are also suitable for use in vibration dampeners and torque struts.

The invention is further illustrated in the following non-limiting examples:

EXAMPLE 1

Various copolymers of acrylonitrile, butadiene and isoprene were hydrogenated to different RDB values and then subjected to differential scanning calorimetry (DSC). Hydrogenation reactions were carried out in a 2 US gallon Parr high-pressure reactor in the laboratory under the following conditions:

| | |
|---|---|
| Cement solids | 6% |
| $H_2$ pressure | 1200 psi |
| Agitator speed | 600 rpm |
| Reactor temperature | 138° C. |
| Catalyst (Tris(triphenylphosphine)-rhodium(I)chloride) loading | 0.13–0.4 phr |
| Co-catalyst (triphenylphosphine) loading | 2–2.33 phr |
| Solvent | Monochlorobenzene |

Results are given in Table 1

TABLE 1

| HINBR | BD/IP wt. % | BD/IP ratio | ACN wt. % | Tg ° C. (1) | H (J/g) (2) | % RDB (3) |
|---|---|---|---|---|---|---|
| A | 65/20 | 3/1 | 15 | −44 | 19 | 4 |
| B | 42/38 | 1/1 | 20 | −47 | 0 | 23 |
| C | 43/44 | 1/1 | 13 | −51 | 0 | 11 |
| D | na | na | 21 | −38 | 0 | 5.5 |
| E | na | na | 17 | −25 | 37 | 4.7 |

(1) Glass transition temperature determined from DSC (midpoint).
(2) Melting Enthalpy- a high value indicates crystallinity, which is undesired; a lower value indicates a better result. A value of zero indicates an amorphous polymer (no crystallinity). Values were determined using DSC.
(3) Residual double bond content, determined by $^1$H-NMR spectroscopy.

The above descriptions (1), (2) and (3) apply equally to the results shown in Example 2, Table 2.

Samples D and E are comparative, and contain no isoprene. Sample D is the commercially available butadiene/acrylonitrile/acrylate terpolymer Therban® XN 535C. Sample E is a hydrogenated copolymer of 17% acrylonitrile and 83% butadiene, with 4.7% RDB.

In particular, Example 1 shows that sample B having a BD:IP ratio of 1:1 has a lower Tg value than comparative sample D, a commercially available low temperature polymer.

EXAMPLE 2

Copolymers of acrylonitrile, butadiene, and isoprene were prepared with three levels of acrylonitrile, namely, 19%, 23% and 25% and three ratios of butadiene to isoprene (BD/IP), namely, 3:1, 2:1 and 1:1, and then hydrogenated to different RDB values. Results are given in Table 2. Samples F to K are in accordance with the invention and sample D is again used as a comparative sample.

TABLE 2

| HINBR | BD/IP % wgt | BD/IP ratio | ACN wt. % | Tg ° C.* | H (J/g) | % RDB |
|---|---|---|---|---|---|---|
| F | 61/19 | 3/1 | 20 | −33 | 16.0 | 3.8 |
| G | 50/25 | 2/1 | 25 | −38 | 1.0 | 6.6 |
| H | 37/38 | 1/1 | 25 | −36 | 0 | 3.8 |
| I | 37/40 | 1/1 | 23 | −40 | 0 | 5.6 |
| J | 54/26 | 2/1 | 19 | −39 | 6.5 | 2.8 |
| K | 42/39 | 1/1 | 19 | −46 | 0 | 7.6 |
| D | na | na | 21 | −38 | 0 | 5.5 |

Sample K, which may be compared to Sample B in Table 1 for composition, shows an improved Tg value, confirming the results of Example 1, Table 1.

Isoprene is less readily hydrogenated than butadiene, and as the isoprene content of a polymer is increased hydrogenation becomes more difficult. To achieve a desired RDB increased catalyst loading, or longer reaction time, or both, may be required. Details of the hydrogenation of samples I, J and K are given in Table 3.

TABLE 3

| HINBR | BD/IP ratio | Cat loading (phr) | TPP loading (phr) | Reaction time (h) | % RDB* |
|---|---|---|---|---|---|
| I | (1/1) | 0.3 | 2 | 11 | 5.6 |
| J | (2/1) | 0.3 | 2 | 9 | 2.8 |
| K | (1/1) | 0.3 | 2 | 9 | 7.6 |

*% RDB of HINBR determined by $^1$H-NMR.

EXAMPLE 3

HINBR's of Example 1 were compounded and subjected to peroxide cure. The recipe used is set forth in Table 4.

TABLE 4

| Compound | phr |
|---|---|
| HINBR or HNBR* or other | 100 |
| Carbon Black, N 660 Sterling-V | 50 |
| Maglite D (MgO activator) | 3 |
| Naugard 445 (antioxidant) | 1 |
| Plasthall TOTM (plasticizer) | 5 |
| Vulkanox ZMB-2/C5 (ZMMBI) (antioxidant) | 0.4 |
| Zinc Oxide (Kadox 920) | 3 |
| Diak #7 (coagent for peroxide) | 1.5 |
| Di-cup 40KE (peroxide curative) | 7.5 |

*Base polymer

The low temperature properties of the cured compounds are given in Table 5. Samples A, B & C are from Example 1 and in accordance with the invention. Samples D, E, also from Example 1, and Therban® C 3467 are comparative.

TABLE 5

| Sample Identification | BD:IP | ACN wt. % | Compression Set @ −30° C. (Cure Temp 170° C.) | Gehman LT Stiffness at 170° Cure Temp | | |
|---|---|---|---|---|---|---|
| | | | | T2 | T10 | T100 |
| A | 3:1 | 15 | 88 | −11 | 35 | −44 |
| B | 1:1 | 20 | 42 | −30 | −40 | −46 |
| C | 1:1 | 13 | 41 | −33 | −44 | −49 |
| D | na | 21 | 81 | −28 | −37 | −42 |
| E | na | 17 | 97 | 3 | −25 | −37 |
| Therban® C 3467 | na | 34 | 93 | −20 | −27 | −31 |

Table 5 shows that HINBR samples containing either 13 wt. % (sample C) or 20 wt. % (sample B) acrylonitrile with a 1/1 BD to IP ratio have very low compression set properties at low temperature. The high content of butadiene in the 15 wt. % ACN sample (sample A) explains the higher compression set value.

The HINBR samples containing the 13 and 20 wt. % ACN content again show the best low temperature properties as seen by Gehman test results. Both samples have a BD/IP ratio of 1/1. Due to low temperature crystallinity, which hinders flexibility at low temperature, the Gehman temperatures are higher in the 15 wt. % ACN HINBR sample (sample A).

The Gehman test determines the relative stiffness characteristics of vulcanized rubber by measuring the angle of twist between −70° C. and room temperature. The first measurement is taken at room temperature. The sample is then cooled down to −70° C. and twisted while it is warming up. The T2 value is the temperature at which the sample is two times as stiff (or the sample is ½ of its original angle).

EXAMPLE 4

Samples of HINBR from Example 2 were compounded and subjected to peroxide cure. The recipe is set forth in Table 6.

TABLE 6

| Compound | phr |
|---|---|
| HINBR or HNBR* | 100 |
| Carbon Black, N 660 Sterling-V | 50 |
| Maglite D | 3 |
| Naugard 445 | 1 |
| Plasthall TOTM | 5 |
| Vulkanox ZMB-2/C5 (ZMMBI) | 0.4 |
| Zinc Oxide (Kadox 920) | 3 |
| Diak #7 | 1.5 |
| Di-cup 40KE | 7.5 |

*Base polymer

Sample J formulation varied in the amount of Diak #7 (5 phr) and Dicup 40KE (9.4 phr) used.

The MDR @ 170° C. cure behaviour and Stress Strain Data of the samples are shown in Table 7.

TABLE 7

| | K | I | G | H | THERBAN® C 3467 | THERBAN® VP KA 8798 | THERBAN® XN 535C |
|---|---|---|---|---|---|---|---|
| MDR CURE CHARACTERISTICS | | | | | | | |
| Test Temp (° C.) | 170 | 170 | 170 | 170 | 170 | 170 | 170 |
| MH (dN·m) | 35.82 | 26.22 | 37.59 | 31.02 | 36.03 | 23.59 | 27.84 |
| ML (dN·m) | 3.01 | 2.2 | 3.91 | 5.75 | 1.59 | 2.54 | 2.14 |
| Delta MH-ML (dN·m) | 32.81 | 24.02 | 33.68 | 25.27 | 34.44 | 21.05 | 25.7 |
| Stress Strain (Dumbells) | | | | | | | |
| Stress @ 25 (Mpa) | 0.9 | 0.9 | 1.1 | 0.9 | 1.1 | 0.9 | 1.0 |
| Stress @ 50 (Mpa) | 1.4 | 1.3 | 1.7 | 1.4 | 1.6 | 1.4 | 1.5 |
| Stress @ 100 (MPa) | 3.1 | 2.8 | 4.0 | 2.9 | 3.5 | 3.0 | 3.4 |
| Stress @ 200 (MPa) | 10.8 | 9.4 | 13.5 | 10.5 | 12.4 | 9.2 | 10.1 |
| Stress @ 300 (MPa) | | 16.0 | | | 21.5 | 15.2 | 16.0 |
| Ultimate Tensile (MPa) | 16.0 | 16.3 | 18.7 | 19.0 | 23.9 | 18.0 | 17.4 |
| Ultimate Elongation (%) | 266 | 302 | 253 | 299 | 345 | 358 | 325 |

TABLE 7-continued

|  | K | I | G | H | THERBAN® C 3467 | THERBAN® VP KA 8798 | THERBAN® XN 535C |
|---|---|---|---|---|---|---|---|
| Hard. Shore A2 Inst. (pts.) | 59 | 60 | 63 | 60 | 63 | 63 | 63 |

The state of cure as measured by delta torque is comparable to current commercial Therban® grades.

The Low Temperature Flexibility—Gehman Test and Temperature Retraction (TR) are shown in Table 8.

TABLE 8

|  | J | K | I | G | H | THERBAN® C 3467 | THERBAN® VP KA 8798 | THERBAN® XN 535C |
|---|---|---|---|---|---|---|---|---|
| GEHMAN LOW TEMP STIFFNESS (at 170° C. cure temperature) | | | | | | | | |
| Cure Time (min) | 14 | 13 | 14 | 13 | 12 | 13 | 14 | 14 |
| Start Temperature (min) | −70 | −70 | −70 | −70 | −70 | −70 | −70 | −70 |
| Temperature @ T2 (° C.) | −23 | −32 | −22 | −23 | −20 | −21 | −20 | −21 |
| Temperature @ T5 (° C.) | −32 | −39 | −31 | −32 | −28 | −26 | −32 | −34 |
| Temperature @ T10 (° C.) | −35 | −41 | −33 | −33 | −30 | −28 | −35 | −36 |
| Temperature @ T100 (° C.) | −42 | −47 | −40 | −40 | −37 | −32 | −41 | −42 |
| TEMPERATURE RETRACTION (at 50% elongation/ 170° C. cure temperature) | | | | | | | | |
| Cure Time (min) | 14 | 13 | 14 | 13 | 12 | 13 | 14 | 14 |
| TR 10 (° C.) | −32 | −41 | −32 | −32 | −29 | −23 | −31 | −32 |
| TR 30 (° C.) | −26 | −36 | −26 | −29 | −25 | −19 | −26 | −28 |
| TR 50 (° C.) | −21 | −32 | −22 | −24 | −22 | −15 | −21 | −24 |
| TR 70 (° C.) | −15 | −26 | −15 | −19 | −19 | −11 | −16 | −19 |
| Temp Retraction TR 10–TR 70 | 17 | 15 | 17 | 13 | 10 | 12 | 15 | 13 |

Sample K reaches the lowest temperatures in the Gehman test. The temperature retraction tests also support the improved low temperature flexibility properties of sample K, giving a TR 10 value of −41° C. compared to the value of −32° C. for Therban® XN 535C. In the temperature retraction test the rubber test piece is elongated to 50% (by locking it) followed by cooling it in an ethanol/dry ice liquid bath (−70° C.). The temperature of the bath is then increased by 1° C. per minute. The elastic retraction was measured by recording the temperature at which the test piece retracts to 10, 30, 50 and 70% of its original shape.

The properties of sample K are compared to Therban® XN 535C in Table 9.

TABLE 9

|  | Sample K | Therban ® XN 535C |
|---|---|---|
| % ACN | 19 | 21 |
| % RDB | 7.6 | 5.5 |
| Peroxide Cure: | | |
| Tensile (MPa) | 16 | 17.4 |

TABLE 9-continued

|  | Sample K | Therban ® XN 535C |
|---|---|---|
| Elongation (%) | 266 | 325 |
| M 100 (MPa) | 3.12 | 3.35 |
| H (Shore A) | 59 | 63 |
| LT Flexibility: |  |  |
| Gehman (° C.) T2 | −32 | −21 |
| T10 | −41 | −36 |
| T100 | −47 | −42 |
| Temp. Retraction (° C.) |  |  |
| TR10 | −41 | −32 |
| TR70 | −26 | −19 |
| Tg (° C.) | −46 | −38 |

Although the elongation @ break % is reduced slightly, the low temperature properties of the HINBR of this invention are improved over current commercial grades of hydrogenated nitrile rubbers for low temperature applications.

The following advantages were obtained in a hydrogenated nitrile/isoprene/butadiene copolymer having a butadiene:isoprene ratio of 3:1 or less:
  improved, lowered glass transition value (amorphous polymer from thermal analysis, DSC)
  improved compression set properties at low temperatures
  increased low temperature flexibility It should be noted that phr as used herein means parts per hundred parts of rubber, and is generally understood in the art. Further, the term copolymer used herein is intended to include polymers composed of two, three or more monomers, as appropriate.

The invention claimed is:

1. A hydrogenated copolymer comprising an unsaturated nitrile, butadiene and isoprene, wherein the molar ratio of butadiene to isoprene is between 0.75:1 to 1:0.75, and wherein the unsaturated nitrile content is between 15 to 25% based on the copolymer.

2. A copolymer according to claim 1, wherein the unsaturated nitrile is acrylonitrile.

3. A copolymer according to claim 2, wherein the unsaturated nitrile is methacrylonitrile.

4. A copolymer according to claim 1 which has a residual double bond content of 30% or less.

5. A copolymer according to claim 4, wherein the residual double bond content is 10% or less.

6. A process for preparing a hydrogenated copolymer comprising an unsaturated nitrite, butadiene and isoprene comprising the steps of
  copolymerizing the unsaturated nitrite, butadiene and isoprene, wherein the molar ratio of butadiene to isoprene is between 0.75:1 to 1:0.75, and wherein the unsaturated nitrile content is between 15 to 25% based on the copolymer and,
  selectively hydrogenating the copolymer obtained.

7. A process according to claim 6, wherein the selective hydrogenation is carried out in the presence of a rhodium-containing compound as catalyst and a co-catalyst ligand.

8. A process according to claim 7, wherein the rhodium-containing compound is tris(triphenylphosphine)-rhodium (I) chloride and the co-catalyst ligand is triphenylphosphine.

* * * * *